United States Patent [19]
Battista

[11] 3,758,660
[45] Sept. 11, 1973

[54] METHOD OF FORMING STRUCTURES FROM MICROCRYSTALLINE COLLAGEN

[75] Inventor: Orlando A. Battista, Forth Worth, Tex.

[73] Assignee: Avicon, Inc., Forth Worth, Tex.

[22] Filed: Oct. 15, 1971

[21] Appl. No.: 189,750

Related U.S. Application Data

[63] Continuation of Ser. No. 43,942, June 5, 1970, abandoned.

[52] U.S. Cl................. 264/202, 264/126, 264/211, 264/331
[51] Int. Cl. ............................................... D01f 9/04
[58] Field of Search.................... 264/202, 183, 184, 264/188, 212, 126, 307, 319, 24, 331; 260/6-8; 106/124-126; 117/100 A; 99/1

[56] References Cited
UNITED STATES PATENTS

| | | | |
|---|---|---|---|
| 3,278,519 | 10/1966 | Battista et al. | 264/212 |
| 3,297,806 | 1/1967 | Battista | 117/100 A |
| 3,393,080 | 7/1968 | Erdi et al. | 264/202 |
| 3,443,261 | 5/1969 | Battista et al. | 264/202 |
| 3,536,647 | 10/1970 | Battista | 260/78 SC |
| 3,551,535 | 12/1970 | Henderson et al. | 106/124 |
| 3,607,328 | 9/1971 | Rose | 214/188 |
| 3,628,974 | 12/1971 | Battista | 106/125 |
| 3,632,350 | 1/1972 | Battista | 99/1 |
| 3,632,361 | 1/1972 | Battista | 106/124 |
| 3,242,120 | 3/1966 | Steuber | 260/6 |

Primary Examiner—Jay H. Woo
Attorney—George F. Mueller, George G. Seems et al.

[57] ABSTRACT

Shaped structures of planar, tubular and molded three-dimensional forms are formed from concentrated dispersions of a water-insoluble, ionizable, partial salt of collagen and a small amount of water.

11 Claims, No Drawings

METHOD OF FORMING STRUCTURES FROM MICROCRYSTALLINE COLLAGEN

This application is a continuation of my copending application Ser. No. 43,942, filed June 5, 1970, now abandoned.

This invention relates to a method of forming shaped structures, such as, for example, fibers, filaments, rods, tubes, films, both planar and tubular, and molded three-dimensional structures from water-insoluble, ionizable, partial salts of collagen commonly referred to as water-insoluble microcrystalline collagen.

Historically, sutures, ligatures and sausage casings were prepared from animal intestinal tissues. Since such tissue varies from animal to animal, substantial variations in properties were encountered and it has been necessary to carefully classify and grade these natural materials. Thus, the intestinal tissues were carefully selected, graded and classified where certain diameter sausage casings were required. This classification and grading is required particularly for modern sausage stuffing and linking machine operations. Furthermore, there is a limited supply of suitable animal intestinal tissue for these purposes. In the case of sausages of the frankfurter type, cellulosic casings are utilized. However, because these casings are inedible, either the manufacturer or user must remove the casing.

Considerable efforts have been expended in an attempt to provide methods for the production of various shaped products such as filaments for use as ligatures and sutures and edible tubular films or sausage casings from various high collagen content materials such as, for example, animal hides, intestinal tissues, tendons, etc. Perhaps the most common of these methods involves treatment of the collagen containing material, after purification, with acid to swell the collagen fibers and fibrils. A slurry of the swollen fibers and fibrils is prepared in water for form an extrudable liquid mass. Because the collagen fibers and fibrils are so highly swollen, the slurries generally contain about 2%, and, if very high viscosities can be handled, up to 4% or 5% by weight of dry collagen fibrils. The slurry is extruded through apertures of the desired configuration into a coagulating and dehydrating bath. The thus formed structure requires special and relatively long period liquid treatments to set up the fragile highly swollen structure before final drying. Briefly, the shaped structure is washed to at least partially remove soluble salts and then requires a treatment in a suitable tanning bath to provide a product having required and necessary wet strength characteristics. Generally, the structure after exposure to the tanning bath requires further washing to remove all soluble salts and following the washing is subjected to a further treatment in an aqueous bath containing a suitable plasticizer, such as glycerol.

The principal purpose of the present invention is to provide a method of forming shaped structures from compositions containing substantially much higher proportions of collageneous material and which does not require conventional wet spinning procedures.

The present invention contemplates a method whereby a structure is formed by shaping a composition comprising at least 10 up to about 90 percent by weight of a water-insoluble, ionizable partial salt of collagen. The composition contains some water, preferably at least about 5% by weight. The hardness, flexibility and pliability of the finished structure may be varied by including in the composition polar-type plasticizers such as additional water, polyhydric alcohols, for example, glycols, polyethylene glycols having average molecular weights from about 400 to 600, glycerol, sorbitol, mannitol, pentaerythritol; other water-miscible liquids, e.g., dimethyl sulfoxide, dimethyl formamide; and the like.

Strength characteristics may be improved by incorporating in the composition various fibers or colloidal microcrystalline polymers to function as reinforcing elements or means. The fibers or colloidal polymers may constitute up to about 25 percent, preferably between 5 and 10 percent, based upon the weight of the collagen salt and may be of any desired size such as conventional textile fibers which may vary from about 1 to 10 denier and may vary in length from ¼ inch to about 1.5 inches. The fibers may be formed of synthetic polymers such as, for example, cellulose esters and ethers, polyesters, nylon, polytetrafluoroethylene, polyphenylene ethers, polyolefins and polycarbonates, and of natural polymers such as, for example, cellulose and regenerated cellulose, asbestos, collagen fibers, amylose fibers, chitin and the like. The microcrystalline polymer reinforcing compositions may be those derived from the foregoing polymer precursors, and these are finely divided into particles, some of which may be colloid-forming size.

The strength of the structures and their resistance to moisture and water may also be improved by the use of cross-linking agents for collagen or by drying treatments which will cause irreversible lateral hydrogen bonds to become engaged. Preferably, cross-linking agents are incorporated in the mixtures during the attrition and mixing period to provide a homogeneous distribution of the agent throughout the mass. Typical cross-linking agents which are satisfactory include the various formaldehyde-base cross-linking agents such as, for example, urea-formaldehyde precondensate and melamine-formaldehyde precondensate, formaldehyde, glyoxal, acetaldehyde, glutaraldehyde, potassium alum, chrome alum, iron alum, basic aluminum acetate, cadmium acetate, copper nitrate, barium hydroxide, water-soluble diisocyanates, etc. The specific cross-linking agent which is utilized will be dependent upon the end use of the products.

Furthermore, water-insoluble phosphate salts, e.g. calcium apatite, calcium dihydrogen phosphate and the like are advantageously dispersed in the collagen salt mixture to serve as dimensional stabilizers for the formed collagen structures.

The specific forming method is dictated by the nature of the compositions. In compositions where the proportion of liquid is relatively high, the structure is formed by an extrusion procedure wherein the composition is extruded into a suitable atmosphere through an orifice of the desired configuration and the structure then dried. At lower proportions of liquid, the composition may be hot pressed into the desired structural form. Alternatively, where the proportion of liquid in the composition is very low, the composition in a dough-like state or in granular or powdered form may be hot pressed, as by conventional transfer molding procedures, directly into the desired configuration or the composition is shaped into a bar or block and subsequently cut and machined into the desired configuration. The water-in-soluble, ionizable partial salt of collagen is prepared in accordance with the copending application of Orlando A. Battista, Ser. No. 14,709, filed Feb. 9, 1970, now U.S. Pat. No. 3,628,974, dated Dec. 12, 1971 which is a continuation of application Ser. No. 586,969, filed Oct. 17, 1966, which application is a continuation-in-part of application Ser. No. 436,371, filed Mar. 1, 1965, now abandoned.

This new form of collagen has a minimum proportion of particles that are in a physical state intermediate between that of swollen collagen fibrils and tropocollagen units. It is water-insoluble, particulate and colloidal, is substantially free of molecular tropocollagen and water-soluble degradation products. The constituent microcrystals or particles consist of bundles of aggregated tropocollagen units and vary in length from that of an individual tropocollagen unit (about 25 to 50A) to under one micron and have diameters from about 25 angstrom units to some hundreds of angstrom units. For the purpose of the present invention, this physical form of collagen should contain at least about 1 percent by weight of submicron colloidal collagen particles. This form of collagen, which is, in fact, a water-insoluble, ionizable salt of collagen, is unique in its characteristic of forming an aqueous soliquoid or nonelastic type gel in concentrations of 0.5% dispersed salt, the gel exhibiting a pH of about 3.2±0.2 and having a substantially stable viscosity for at least 100 hours at 5°C. when stored in a closed container. This is in sharp contrast to the aqueous elastic or emulsoid type gels formed by tropocollagen and degraded forms of collagen such as gelatin which thicken or exhibit substantial increases in viscosity on standing to produce rubbery masses.

As disclosed in the aforementioned applications, this new physical forms of collagen is prepared preferably from undenatured collagen by treatment of the undenatured collagen with dilute acid solutions having a pH of from about 1.6 to 2.6. The treated collagen is subsequently mechanically disintegrated in an aqueous liquid until at least about 1 percent, preferably 25 percent to 85 percent or more, has been reduced to a submicron, colloidal size. Collagen fibrils exhibit a morphological repetitive band structure which is destroyed in the preparation of this new physical form of collagen and the individual or microcrystalline particles are particulate fibril fragments comprising essentially aggregated tropocollagen units.

The action of the acid is three-fold. First, the acid serves to cause a limited swelling of the fibers. Second, there is a limited hydrolysis of selective peptide linkages within the non-crystalline or lowest ordered regions of the collagen fibrils that leads to a partially discontinuous disruption of the original material morphology. Subsequent mechanical disintegration permits a ready fragmentation of the weakened morphology into microcrystalline particles having dimensions intermediate between those of tropocollagen and collagen fibrils. Third, a portion of the acid reacts with available primary amino groups of the collagen to form what may be termed a partial salt of collagen which becomes ionized in the presence of water.

More accurately, the partial salt of collagen produced retains substantially the morphology of the original more ordered or microcrystalline portion of the collagen fibrils and the subsequent mechanical attrition serves to separate or deaggregate the "unhinged" microcrystals laterally. When the amino acid residues of bovine corium collagen, for example, are considered, 1 gram of collagen contains approximately 0.78 millimole of primary amino groups which could react with an added acid. In other words, when the acidic treatment is sufficiently severe to allow the acid to react with all amino groups, the resulting collagen salt would contain a stoichiometric bound acid content of about 0.78 millimole of acid per gram of collagen. Complete substitution of all available amino groups would lead to a disruption of essentially all of the lateral hydrogen bonding forces within the collagen fibril through progressive swelling with attendant development of low molecular weight degradation products. The so-called microcrystalline collagen or the water-insoluble, ionizable, partial salt of collagen utilized in forming the products of the present invention exhibit a bound acid content varying from about 0.4 to about 0.7 millimole of acid per gram of collagen, or expressed in percentages, the bound acid content of the salt varies from about 50 to about 90 percent of the theoretical stoichiometric bound acid content. In other words, the conditions employed in forming the collagen salt are controlled so as not to form completely a stoichiometrically theoretical acid salt.

Acids which are satisfactory include both inorganic and ionizable organic acids such as, for example, hydrochloric acid, sulfuric acid, hydrobromic acid, phosphoric acid, cyanoacetic acid, acetic acid and citric acid. Phosphotic acid, acetic acid and citric acid are preferred. Citric acid and hydrochloric acid are substantially equivalents and permit ready flexibility and ease of control in the treatment of the collagen. "Ease of control" has reference to the ability to arrest the swelling and hydrolysis of the collagen fibers at that point whereby the insoluble colloidal material is formed and is retained while preventing the rapid degradation of the collagen to a soluble degradation product. In lieu of the acids, acid salts may be used satisfactorily. Thus, for example, dihydrogen sodium or ammonium phosphates may be substituted for phosphoric acid, or ammonium or sodium hydrogen sulfates may be substituted for sulfuric acid.

One of the preferred sources of collagen is purified bovine hide and for the purposes of the present invention the hide may be in a ground fibrous form and is subjected to extraction with organic liquids such as acetone to reduce the fatty material content.

In forming products from compositions containing from 10 percent to about 40 percent solids, the water-insoluble, ionizable partial salt of collagen and the liquid are thoroughly mixed, utilizing apparatus in which the collagen salt will be subjected to attrition. For example, where the collagen salt comprises up to 40% by weight or more, conventional planetary mixers, sigma blade mixers, and screw press or meat grinder type apparatus may be employed. In the latter type of apparatus, the mass is advanced by means of a worm and is smeared across a foraminous end plate and also is extruded through the apertures in the end plate. Preferably, in the use of such apparatus, the material is subjected to several passes through this equipment. A conventional commercial form of apparatus of this type is the Rietz Extructor. Where the solids content exceeds about 40 percent, mixers such as a Banbury mixer or a Readco Continuous Processor and equipment such as used in milling of paint pigments wherein the wet or moist mass is subjected to roller action, for example, a conventional Mixmuller, may be used. In preparing the composition, the collagen salt may be in dry form and mixed with the required liquids but is preferably in a never-dried state, i.e., without initial drying of the partial collagen salt after its preparation. Desired additives such as fibers, cross-linking agents, coloring materials, either dyes or pigments, plasticizing agents and any other desired additives are preferably dispersed in the liquid prior to mixing with the collagen salt.

Where the solids content of the composition is below about 40 percent, the composition may be extruded through a die or orifice having the desired configuration into the atmosphere, preferably a heated atmosphere at a temperature below the boiling point of the liquid content at atmospheric pressure to prevent formation of bubbles or voids in the structure. In order to improve the strength characteristics, the extruded structure is subjected to a stretching operation, if desired, prior to final drying. The structure is stretched an amount to improve its tensile strength without excessive loss of elongation properties. Since the structures absorb moisture from the atmosphere due to the nature of the collagen salt, the structure is preferably dried to a moisture content of between about 8 and 12 percent, the equilibrium range for the collagen salt under normal average atmospheric conditions. Subsequent further drying of the formed product may be desirable to very low moisture contents (less than 1 percent) where deliberate hydrogen bonding is produced to improve dimensional stability.

Where conventional transfer molding techniques are utilized, the collagen salt content of the composition will generally be at least 50 percent by weight. In this procedure, the composition is generally in a moist, dough-like, fibrous, or granular condition and is fed to a preheating chamber or to preheating chambers where the mass is heated gradually to about 125°C. and is then extruded through an orifice having the desired configuration, e.g., to form continuous filaments, fibers, rods, tubes, sheets or films. Alternatively, the mass may be placed in a mold cavity of the desired configuration and hot pressed at temperatures of from about 125°C. to about 150°C., the pressure varying from several thousand pounds per square inch to 25 to 30 tons per square inch.

In order to illustrate the general method of forming structures by a so-called dry forming operation, the following examples are set forth.

EXAMPLE 1

The partial salt of collagen was prepared by treating one part by weight of vacuum freeze-dried bovine collagen fibrous flour form with 100 parts of an aqueous solution of hydrochloric acid having a pH of about 2.4. Excess liquid was separated from the mass and the collagen salt recovered and dried to a moisture content of about 11.7 percent. 181 parts by weight of the dry salt, 32 parts by weight of glycerine and 587 parts by weight of deionized water were thoroughly mixed in a jacketed sigma blade mixer for about 2 hours at a temperature not exceeding about 30°C. The resulting gel-like paste was extruded in a Brabender screw extruder through orifices having a diameter of 62 mils to produce a tow. In this specific apparatus, the gel like paste passes through three separate heating zones, the temperatures of which are regulated independently of each other. In the specific example, one extrusion was made wherein the first zone was heated to a temperature of 50°C., the second zone to 45°C. and the extrusion zone, 32°C. In further runs, all first zones were maintained at 50°C., the second zones varied from 75°C. to 125°C. and the extrusion zones varied from 40° to 50° C.

The filaments produced were generally round in cross section and although the filaments were somewhat tacky, they could be separated from the tow without rupturing. Where the temperature of the second and third heating zones did not exceed about 50°C., the filaments produced were somewhat opaque. Where either the second or third heating zone was at a temperature of at least and exceeded 50°C., but did not exceed about 100°C., the filaments were translucent. Where the temperature of either the second or third heating zone exceeded about 100°C., the filaments were opaque.

All of the filaments were subsequently dried to a moisture content of about 10 percent in the atmosphere at a temperature of about 22°C. and a relative humidity of about 50 percent. The filaments in all cases were pliable with tensile strengths of the order of 1,000 psi.

As indicated hereinabove, the tensile strength may be improved substantially by incorporating in the extrusion mass fibers, colloidal materials such as microcrystalline cellulose, mineral silicates, polyamides or polyesters and/or conventional cross-linking agents for collagen. If desired, the filaments may be colored by the addition of dyes or pigments.

EXAMPLE 2

A gel paste was formed as described in Example 1 containing 15 percent by weight of the collagen salt by the use of a Rietz Extructor. The gel paste was then transferred to a pressure vessel provided with a spinneret, the orifices of which had diameters of 62 mils. The gel paste was heated to a temperature of about 65°C. Nitrogen was introduced into the vessel at a gauge pressure of 25 to 30 psi. One group of extruded filaments was stretched about 100 percent after leaving the extrusion orifices. Another group was stretched 150 percent, a third group, 200 percent, and a fourth group, 240 percent. The stretched filaments in each instance were collected and allowed to dry in the air at a temperature of about 22°C. and a relative humidity of about 50 percent. The filaments after drying under these conditions exhibited an elongation at the break of between 5 and 10 percent. The tensile strengths of the groups of filaments were approximately $15 \times 10^3$, $25 \times 10^3$, $30 \times 10^3$, and $40 \times 10^3$ psi, respectively. All of the filaments had an amber cast and were translucent, resembling natural catgut suture materials in appearance.

EXAMPLE 3

Dried collagen partial salt containing about 10 percent moisture is slurried in a mixture of 10 parts by weight of water to 2 parts by weight of glycerine at a solids content of about 10 percent. Another sample is prepared using 10 parts by weight of water and 4 parts by weight of glycerine as the liquid constituent. after thorough mixing in a sigma blade mixer for 60 hours, the mixtures are vacuum dried at temperatures of 25° to 30°C., 7 to 10 mm of mercury for 24 hours. The two samples contain approximately 65 percent by weight collagen salt and 35 percent by weight glycerine and 52 percent by weight collagen salt and 48 percent by weight glycerine, respectively. The samples are then conditioned by allowing them to stand in the air for 16 hours in a controlled humidity room (58 percent R.H. 72°F) to permit equilibrium absorption of moisture. The conditioned samples contain approximately 50 percent collagen salt, 27 percent glycerine and 23 percent water and 45 percent collagen salt, 42 percent glycerine and 13 percent water, respectively.

A mold is formed by placing a polyester film on the bottom of a press. A brass frame, 11 inches by 11 inches, and a height of 10 mils is placed on the polyester film. The conditioned sample is spread uniformly in the enclosed area and a second polyester film placed over the sample. The upper platen of the press is lowered and the platens heated to a temperature of about 125°C. and, after several minutes, a pressure of 20.5 tons per square inch applied to the heated sample. The temperature and pressure are maintained for about 10 minutes after which cooling water is passed through the platens to reduce the temperature to about room temperature while maintaining the pressure. The resulting pressed films upon removal from the press have a thickness of about 12 mils and are clear although they had a very slight amber color.

EXAMPLE 4

45 parts by weight of the dried collagen salt as described in Example 1 was slurried with 55 parts by weight of water and allowed to soak for 4 hours. The resulting mixture was passed through a 5 inch diameter, 36 inch long Readco Continuous Processor twice.

Energy in-put on the first pass was such as to cause the product coming out of the machine to have a temperature of 80°–84°C. On the second pass, the product mix exuding from the machine reached a temperature of 130-135°C.

The resulting homogeneous but extremely high viscosity paste was extruded in the form of a ½ inch square rod which upon drying down was an extremely tough, lightweight machinable plastic-like material.

EXAMPLE 5

The procedure of Example 4 was repeated except that 10 percent of fibrous corium collagen fibers based on the weight of the dried collagen salt was added to the aqueous slurry. These fibers were prepared by passing pieces of split hide through a standard Urschel mill with a setting in the grinding head of 0.060 inch which converted the hide into a comminuted fibrous form. The fibrous corium collagen served as a reinforcing agent in the ½ inch square extruded rod.

EXAMPLE 6

25 parts by weight of the dried collagen salt of Example 1 was slurried in 25 parts by weight of a mixture comprising 50 percent water and 50 percent calcium dihydrogen phosphate and allowed to soak for 4 hours. The resulting mixture was treated in a Readco Continuous Processor exactly as was done in Example 4.

The extruded dried product had the appearance of natural cortical-type bone. It was readily machinable into nuts and bolts and similar prosthetic type shapes.

Although the foregoing examples illustrate the production of various products from a dried partial salt of collagen, it is not necessary to recover the dry salt and subsequently incorporate it with the liquid in order to provide a mass capable of being shaped. The collagen source material may be treated with the required acid solution to form the desired salt and after addition of desired materials and thorough mixing the liquid content is then reduced to provide a mass which may be shaped by extrusion or molding processes.

EXAMPLE 7

The partial salt of collagen is prepared as described in Example 1 except that excess liquid is removed by centrifugation to obtain a solid concentration of the partial salt of collagen of about 30 percent by weight. 10 parts of glycerine (based on the collagen content) is added to this mixture with thorough mixing. The resulting gel-like paste is extruded as described in Example 1 to obtain filaments of similar properties.

EXAMPLE 8

A 30 percent by weight aqueous mixture of partial salt of collagen is prepared as described in Example 7. 10 percent of microcrystalline polyamide powder, based on the weight of the partial salt of collagen, is thoroughly dispersed in the mixture.

The microcrystalline polyamide is prepared as disclosed in U.S. Pat. No. 3,299,011, and specifically by treating nylon fibers (paper grade) with a 5 percent aqueous solution of hydrochloric acid at reflux for 2 ½ hours. The product is filtered, water washed and dried with acetone. The dried product is then swollen in 45 percent aqueous formic acid overnight and water washed. The product is mixed with water to a 1.5 percent solids content and attrited for 30 minutes in a Waring Blendor. The product is then freeze dried to a fine powder.

The aqueous mixture of partial salt of collagen containing 10 percent by weight of microcrystalline polyamide dispersed therein is passed through a Readco Continuous Processor as described in Example 4 and the resulting paste is extruded in the form of a rod which is allowed to dry in air to obtain a microcrystalline polyamide reinforced plastic-like material.

EXAMPLE 9

The partial salt of collagen is prepared as described in Example 1. However, instead of separating excess liquid and drying, the aqueous mixture was freeze dried. The freeze dried partial salt of collagen is then mixed with glycerine and water and this mixture further processed to form filaments in the manner shown in Example 1.

Various changes and modifications may be made in practicing the invention without departing from the spirit and scope thereof and, therefore, the invention is not to be limited except as defined in the appended claims.

I claim:

1. The method of forming a self-supporting, three-dimensional structure which comprises preparing a composition consisting essentially of from 15 to about 90 percent by weight of a water-insoluble, ionizable, partial salt of collagen having a bound acid content between about 50 and 90 percent of the theoretical stoichiometric bound acid content, at least 1 percent of the partial salt having a particle size of less than 1 micron, at least 5% by weight of water and a water-miscible, polar-type plasticizer selected from the group consisting of water, glycols, polyethylene glycols having average molecular weights from about 400 to 600, glycerol, sorbitol, mannitol, pentaerythritol, dimethyl sulfoxide and dimethyl formamide, heating the composition to a temperature of at least 50°C., pressing the heated composition into a predetermined structural configuration and drying the structure in the ambient atmosphere.

2. The method as defined in claim 1 wherein the plasticizer is glycerol.

3. The method as defined in claim 1 wherein the composition includes fibers in an amount up to about 25 percent based on the weight of the partial salt of collagen, the fibers being selected from the group consisting of cellulose esters, cellulose ethers, polyesters, nylon, polytetrafluoroethylene, polyphenylene ethers, polyolefins, polycarbonates, cellulose, regenerated cellulose, asbestos, collagen fbers, amylose fibers and chitin.

4. The method as defined in claim 1 wherein the fibers are collagen fibers.

5. The method as defined in claim 1 wherein the composition includes colloidal microcrystalline nylon in an amount up to about 25 percent based on the weight of the partial salt of collagen.

6. The method as defined in claim 1 wherein the composition includes a cross-linking agent selected from the group consisting of urea-formaldehyde precondensate, melamine-formaldehyde precondensate, formaldehyde, glyoxal, acetaldehyde, glutaraldehyde, potassium alum, chrome alum, iron alum, basic aluminum acetate, cadmium acetate, copper nitrate, barium hydroxide and water-soluble diisocyanates.

7. The method as defined in claim 1 wherein the heated composition is placed in a mold cavity and is pressed in heated state in the mold cavity into the structural configuration.

8. The method as defined in claim 1 wherein the heated composition is pressed in heated state through a shaped orifice into the ambient room atmosphere.

9. The method as defined in claim 8 wherein the structure is a continuous filament.

10. The method as defined in claim 8 wherein the structure is a continuous sheet.

11. The method as defined in claim 1 wherein the composition contains at least 45 percent of the partial salt of collagen, the composition is placed in a mold cavity, is heated to a temperature of about 125°C. and is pressed in heated state in the mold cavity.

* * * * *